United States Patent
Sawada

(10) Patent No.: US 6,185,364 B1
(45) Date of Patent: Feb. 6, 2001

(54) IMAGE AND SOUND REPRODUCING DEVICE

(75) Inventor: Hideki Sawada, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/144,228

(22) Filed: Aug. 31, 1998

(30) Foreign Application Priority Data

Aug. 29, 1997 (JP) .................................................. 9-233904

(51) Int. Cl.$^7$ .................................................. H04N 5/928
(52) U.S. Cl. .................................................. 386/95; 386/104
(58) Field of Search ................................. 386/46, 95, 98, 386/111, 112, 125, 126, 96, 104, 105; 348/468; H04N 5/76, 5/928

(56) References Cited

U.S. PATENT DOCUMENTS 5,684,542 * 11/1997 Tsukagoshi ........................... 348/468
5,930,450 * 7/1999 Fujita ..................................... 386/95

FOREIGN PATENT DOCUMENTS

| | | |
|---|---|---|
| 60-194682 | 10/1985 | (JP) . |
| 2-19088 | 1/1990 | (JP) . |
| 5-244546 | 9/1993 | (JP) . |
| 6-44691 | 2/1994 | (JP) . |
| 6-303545 | 10/1994 | (JP) . |
| 6-314092 | 11/1994 | (JP) . |
| 7-222105 | 8/1995 | (JP) . |
| 8-322046 | 12/1996 | (JP) . |

* cited by examiner

Primary Examiner—Huy Nguyen
(74) Attorney, Agent, or Firm—Ostrolenk, Faber, Gerb & Soffen, LLP

(57) ABSTRACT

A command table stores header information showing a display time and a display method of an auxiliary image which is added to the encoded data. A reference clock generating part obtains an accumulation data amount of PCM data which is output after the reproduction of data from the sound output part is started and analyzed attribute information from the sound decoding part. An auxiliary image output part outputs a sub-picture which is prepared in accordance with the display method of the auxiliary image which is recorded in the command table and outputs the sub-picture to the image superposition part in accordance with the display time which is recorded in the command table. The decoding processing of the auxiliary image data and the superposition processing at the image superposition part is carried out in synchronization with the reference clock.

6 Claims, 12 Drawing Sheets

IMAGE AND SOUND REPRODUCING DEVICE

BACKGROUND OF THE INVENTION

1. Field of the Invention

The present invention relates to an image and sound reproducing device, and more particularly to an image and sound reproducing device for decoding and reproducing encoded data in which digitally compressed and encoded image data, auxiliary image data such as superimposed characters or the like which is digitally compressed and encoded in the same manner separately from the image data, and sound data which is digitally compressed and encoded in the same manner is multiplexed respectively.

2. Prior Art

Conventionally, there is known an image and sound reproducing device for displaying a main image and an auxiliary image in a superposition manner by subjecting to a decoding processing separately encoded data in which digitally compressed and encoded auxiliary image data such as superimposed characters for films and words for karaoke are multiplexed in addition to normal image data and sound data digitally compressed and encoded (for example, Japanese Patent Application Laid-Open No. 6-314092).

FIG. 1 is a block view showing one example of the conventional image and sound reproducing device which has been described above. This conventional reproducing device reproduces multiplexed encoded data which is recorded on a recording medium 181. On the recording medium 181, auxiliary image data such as character data which is encoded in run-length encoding is multiplexed and recorded in advance in digitally compressed encoded normal image data and sound data.

The reproducing device reproduces encoded data which is recorded and multiplexed in this recording medium 181 and the data separating part 182 separates the data. Then, the auxiliary image data is supplied to an auxiliary image decoding part 183, and the main image data is supplied to a main image decoding part 184 with the result that the main data and the auxiliary data is decoded and processed separately in the auxiliary and main image decoding parts 183 and 184. The decoded auxiliary image data is overlapped with the decoded main image data at the image data superposition part 186 to be output as an image signal. Furthermore, the compressed encoded sound data which is separated at the data separating part 182 is supplied to a sound decoding part 185 and is decoded and processed to be output as a sound signal.

Furthermore, as a synchronization reproduction method of such digital compressed and encoded data, there is the MPEG (Moving Picture Experts Group) method which is an international standard for compressing moving pictures. In the encoded data in the MPEG method, image and sound data, as well as two kinds of time codes which is used for synchronizing and reproducing the sound and image data is multiplexed. One of the time codes is a SCR (System Clock Reference) which is a reference time code for generating a reference clock at the reproducing device while the other time code is s PTS (Presentation Time Stamp) displaying the image data and the sound data and indicating output time.

FIG. 2 is a block view showing one example of the conventional reproducing device on the basis of the MPEG method. The data separating part 192 separates a time code for synchronization control together with the image data and sound data which is reproduced from the recording medium 191. The SCR which is a time code for generating the reference clock is sent to the reference clock generating part 193 and is used for initialization or correction of the reference clock.

Furthermore, the data separating part 192 sends the PTS 1 showing the display time of the auxiliary image to the auxiliary image decoding part 194, and the PTS 2 showing the display time of the main image to the main image processing part 195, and the PTS 3 showing the output time of the sound to the sound decoding part 196 respectively. After the main image decoding part 195 decodes and processes encoded data of the main image which is input through the data separating part 192, the main image decoding part 195 compares the PTS 2 with the reference clock from the reference clock generating part 193 so that the decoded main image data is output to the image data superposition part 197 at the time when the reference clock agrees with the PTS 2.

Furthermore, after the auxiliary image decoding part 194 decodes and processes the encoded data of the auxiliary image which is input through the data separating part 192, the auxiliary image decoding part 194 compares the PTS 1 with the reference clock from the reference clock generating part 193 so that the decoded auxiliary image data is supplied to the image data superposition part 197 at the time when the reference clock agrees with the PTS 1 to be overlapped with the decoded main image data. Furthermore, after the sound decoding part 196 decodes and processes the sound encoded data which is input through the data separating part 192, the sound decoding part 196 compares the PTS 3 with the reference clock from the reference clock generating part 193 to be output at the time when the reference clock agrees with the PTS 3.

However, with the conventional reproducing device, in the case where the reproducing device is realized by means of software, the data processing capability of the reproducing device is lowered with the result that the decoding processing of the auxiliary image data such as superimposed characters and words for karaoke and superposition processing of the auxiliary image data to the main image cannot be carried out in real time in some cases. In such cases, the superposition processing of the auxiliary image is appropriately thinned out (data pieces are thinned out) so that the synchronization correction is required to be carried out.

However, in the conventional reproducing device such as recording and reproducing device for characters and images shown in FIG. 1, the synchronization correction is not carried out in the case where the data processing capability of the reproducing device is lowered and the image cannot be processed in real time.

Furthermore, in the conventional reproducing device shown in FIG. 19 in accordance with the aforementioned MPEG method, the resolution of the SCR which is reference time code for generating the reference clock with the reproducing device is either 90kHz or 27MHz with the result that there is a problem with the precision of the reference clock which is generated in the case where the reproducing device is realized by means of software.

SUMMARY OF THE INVENTION

An object of the present invention is to provide an image and sound reproducing device which can reproduce an image and sound in a synchronous manner in the case where decoding processing of an auxiliary image data such as superimposed characters and words for karaoke and superposition processing of the auxiliary image to the main image cannot be carried out in real time.

Another object of the present invention is to provide an image and sound reproducing device which can reproduce in a synchronous manner auxiliary image data and sound data such as superimposed characters and words for karaoke by generating a reference clock without using an SCR which is a reference code for generating a reference clock which is multiplexed with the encoded data in the case where a reproducing device is constituted in accordance with the MPEG method.

The image and sound reproducing device according to the present invention decodes and reproduces multiplexed data in which auxiliary image data which is digitally compressed and encoded in the same manner such as superimposed characters for films and words for karaoke is multiplexed in addition to digitally compressed and encoded image and sound data.

The image and sound reproducing device according to the present invention comprises:

a data separating part for separating and processing main image data, auxiliary image data and sound data from multiplexed data;

a sound decoding part for decoding and processing main image data which is separated at the data separating part;

a main image decoding part for decoding and processing main image data which is separated at the data separating part;

an auxiliary image decoding part for decoding and processing auxiliary image data which is separated at the data separating part;

a reference clock generating part for calculating progress time after the start of the reproduction from the accumulation of the sound data amount which is output after decoding by the sound decoding part and the attribute information which is analyzed at the sound decoding part and generating a reference clock on the basis of the progress time:

auxiliary image output means for controlling an output of the auxiliary image data which is decoded with the auxiliary decoding part on the basis of the reference clock; and image superposition means for superposition the auxiliary image data which is output from the auxiliary image output means with the main image data which is decoded with the main image decoding part.

According to the present invention, in the case where the reproducing device is constituted in accordance with the MPEG method, progress time after the start of the reproduction is calculated from the accumulation of the amount of sound data and the attribute information which is analyzed with the sound decoding part and the reference clock is generated on the basis of the progress time so that the reference clock can be generated without using an SCR which is a reference time code for generating the reference clock which is multiplexed with the encoded data. At the same time, the decoding processing of the auxiliary image and the superposition processing of the auxiliary image with the main image can be carried out in synchronization with the reference clock.

Furthermore, the present invention is constituted in such a manner that the display time and the display method of the next auxiliary image data in the command table is referred to when the current time obtained on the basis of the reference clock is compared with the display time obtained by referring to the command table, and when the current time passes a plurality of unread display time in the command table 1 so that the auxiliary image data from the buffer is subsequently renewed and processed, and, at the same time, only the auxiliary image data which is renewed and processed by referring to the unread display time corresponding to the last display time out of a plurality of unread display times is thinned out and output.

In the present invention, in the case where the processing capability of the reproducing device is lowered so that the decoding processing of the auxiliary image data such as superimposed characters and words for karaoke and the superposition processing of the auxiliary image data with the main image data cannot be carried out in real time, only the auxiliary image data is output which is renewed and processed by referring to the unread display method corresponding to the last display time after the renewal processing of the auxiliary image data is carried out in a plurality of display methods with the result that the defect display can be prevented with the omission of only the output processing.

According to the present invention, the progress time after the start of the reproduction is calculated from the analysis result of the sound decoding part and the accumulation of the sound decoded data amount without using the SCR which is a reference time code for generating the reference clock which is multiplexed with the encoded data, the reference clock is generated on the basis of the progress time, and the decoding processing of the auxiliary data and the superposition processing of the auxiliary data with the main image data in synchronization with the reference clock with the result that the auxiliary data such as superimposed characters and words for karaoke and the sound data can be reproduced synchronically in more precise manner than the conventional method.

Furthermore, according to the present invention, in the case where the processing capability of the reproducing device is lowered so that the decoding processing of the auxiliary image data such as superimposed characters and words for karaoke and the superposition processing of the auxiliary image data with the main image data cannot be carried out in real time, only the auxiliary image data is output which is renewed and processed in the renewal processing of the auxiliary image data by referring to a plurality of unread display method and then referring to the unread display method corresponding to the last display time with the result that the defect display can be prevented with the omission of only the output processing and the auxiliary image data can be reproduced in synchronization with the sound data while carrying out thin out processing of the auxiliary image data.

DESCRIPTION OF THE PREFERRED EMBODIMENT

Next, a preferred embodiment of the present invention will be explained by referring to the accompanied drawings.

Figure 3:
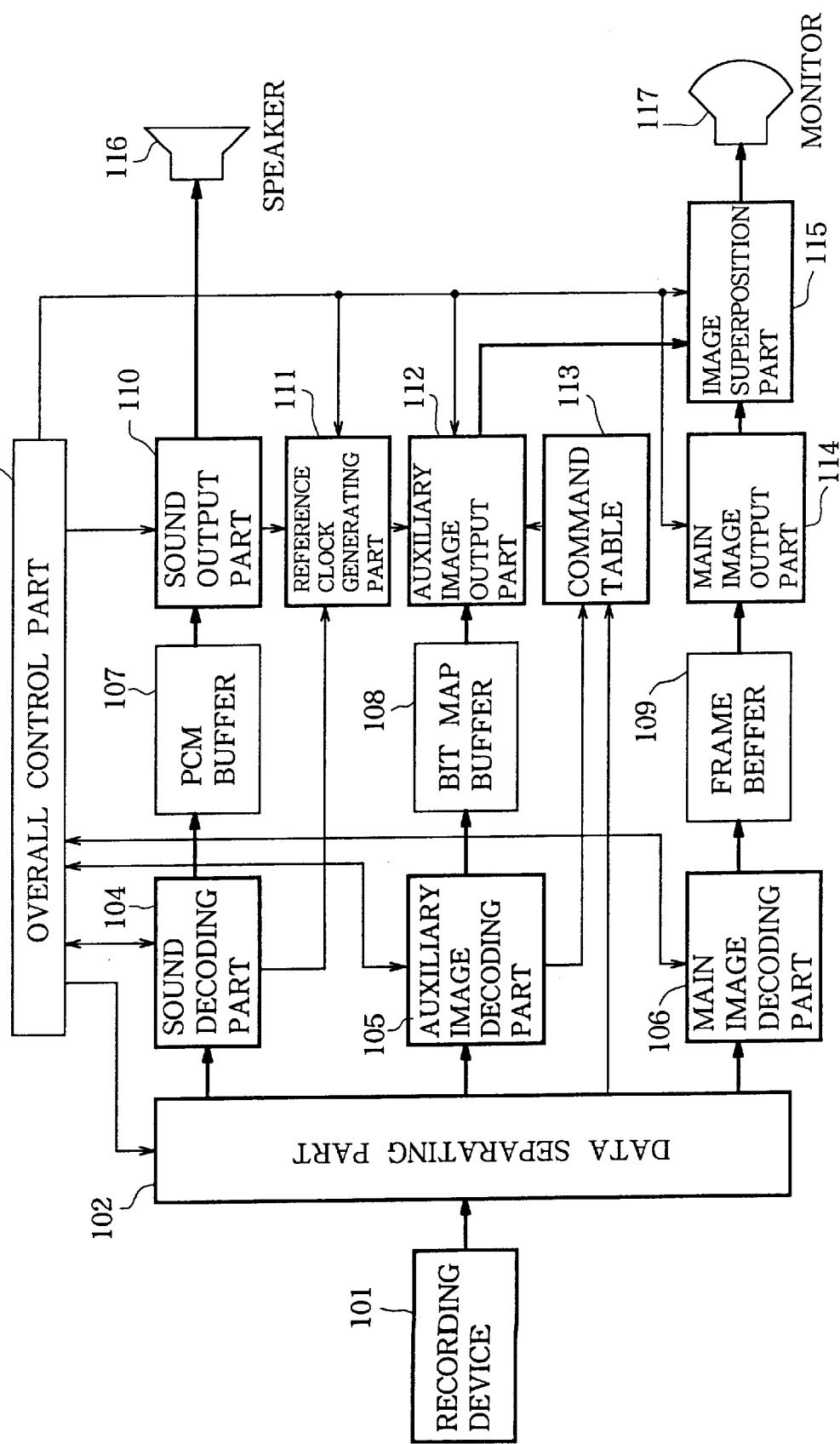
FIG. 3 is a block diagram showing an image and sound reproducing device according to an embodiment of the present invention.

FIG. 3 is a block diagram showing an image and sound reproducing device according to one embodiment of the present invention.

In the beginning, an overall control part 103 will be explained. The overall control part 103 controls by switching over a data separating part 102, a sound decoding part 104, an auxiliary image decoding part 105, a main image decoding part 106, a reference clock generating part 111, a sound output part 110, an auxiliary image output part 112, a main image output part 114 and an image superposition part 115.

In the case where the data is not separated and processed which is necessary and sufficient for allowing the sound decoding part 104, the auxiliary image decoding part 105 and the main image decoding part 106 decodes and processes the data, the overall control part 103 designates the amount of data which is to be separated at the data separating part 102 to separate the sound data and the main image data and the auxiliary image data. The aforementioned data amount is the encoded data amount of the sound data, the main image data or the auxiliary data amount, and can be separated on the basis of either of the sound data or the main or auxiliary image data. Other data will be separated and processed along with it.

On the other hand, in the case where the data is separated and processed which is necessary and sufficient for allowing the sound decoding part 104, the auxiliary image decoding part 105 and the main image decoding part 106, the overall contact part 103 designates decoding process at the sound encoder part 104, the auxiliary image decoding part 105 and the main image decoding part 106. Further, the overall control part 103 outputs and processes data which is decoded and processed at the sound output part 110, the auxiliary image output part 112, and the main image output part 114, and, at the same time, overlaps and processes the main image and the auxiliary image at the image superposition part 115.

Next, the data separation part 102 will be explained. The data separation part 102 reads encoded data having an appropriate length from a memory device 101. Generally, the digitally encoded data in which image data and sound data is multiplexed is added with information concerning data at the front of the data line. This is called "header information", or simply "head". Information concerning data is the kind of data, data line and time information.

The data separation part 102 analyzes header of encoded data which is read to extract the sound data, the auxiliary image data and the main image data. The extracted sound data, the auxiliary image data, and the main image data is input to the sound decoding part 104, the auxiliary image decoding part 105, and the main image decoding part 106 respectively. Then, the processing is repeated until the total amount of the extracted sound data, the auxiliary image data or the main image data exceeds the designated data amount from the overall control part 103.

Furthermore, the data separation part 102 separates display time information of the auxiliary image data out of the header information to be stored in the command table 113.

Next, the sound decoding part 104 will be explained. The sound decoding part 104 reads the sound data which is separated at the data separation part 102, and decodes and processes the sound frame portion which is designated by the overall control part 103 and stores the PCM data which is obtained in decoding in the PCM buffer 107. Furthermore, the sound decoding part 104 analyzes the attribute information showing a sampling rate and the channel number which is added in the sound data at the same time. The PCM data which is temporarily stored in the PCM buffer 107 is output to the speaker 116 via the sound output part 110.

Next, the auxiliary image decoding part 105 will be explained. The auxiliary image decoding part 105 reads the auxiliary data which is separated at the data separation part 102 to decode and process one unit portion of the auxiliary image data. Here, the unit refers to one sheet of bit map data which is constituted with one or more character data. Then the auxiliary image decoding part 105 stores the bit map data in the bit map buffer 108, and at the same time, extracts header information showing the display time and the display method of the auxiliary information which is added in the auxiliary data to be stored in the command table 113.

Next, the main image decoding part 106 will be explained. The main image decoding part 106 reads the main image data which is separated at the data separation part 102 to decode and process one frame portion and stores the frame data obtained in decoding in the frame buffer 109. The frame data which is temporarily stored in the frame buffer 109 is output to the monitor 117 via the main image output part 114 and the image superposition part 115.

Next, the reference clock generating part 111 will be explained. The reference clock generating part 111 obtains the accumulation data amount of PCM data which is output after the start of the reproduction from the sound output part 110 and analyzed attribute information from the sound decoding part 104, and calculate the progress time after the start of reproduction by using the accumulation data amount and the attribute information. Then, the first sound frame which is reproduced at this progress time and added with the original display time is used as the reference clock which is used in the synchronous control.

Figure 4:
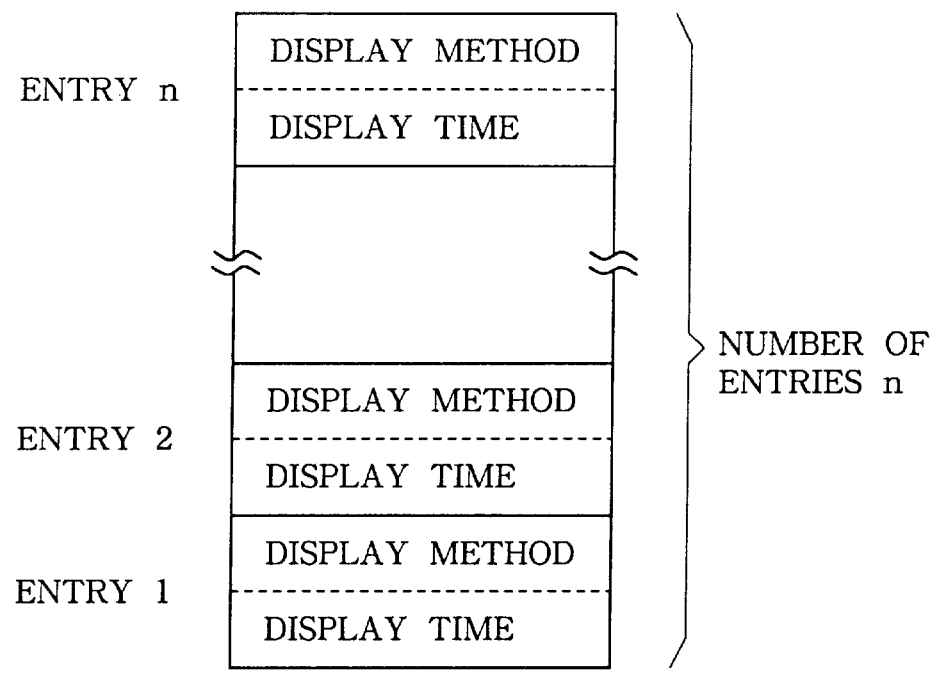
FIG. 4 is a buffer structure diagram of one example of a command table in FIG. 3.

Next, the command table 113 will be explained. The command table 113 is a buffer in which header information is stored which shows the display time and the display method of the auxiliary image which is added with the encoded data. FIG. 4 shows a buffer structure diagram of the command table 113. As shown in FIG. 4, the command table 113 is a collection of entry in which the header information of the display time and the display method is stored as a set of entry (there is n entries here). Furthermore, the command table 113 is a ring buffer having a definite length. When the command table 113 stores the header information up to the last entry without designation, the entry is brought back to the first entry to continue the storing.

Next, the auxiliary image output part shown in FIG. 3 will be explained. The auxiliary image output part 112 performs the following two controls. One control is intended to prepare auxiliary image data (which will be called a sub-picture hereinafter) which is output by using part or all of the one unit portion of bit map data which is stored in the bit map buffer 108 in accordance with the display method which is recorded in the command table 113. The other control is intended to output the sub-picture to the image superposition part 115 in accordance with the display time which is recorded in the command table 113.

Figure 5:
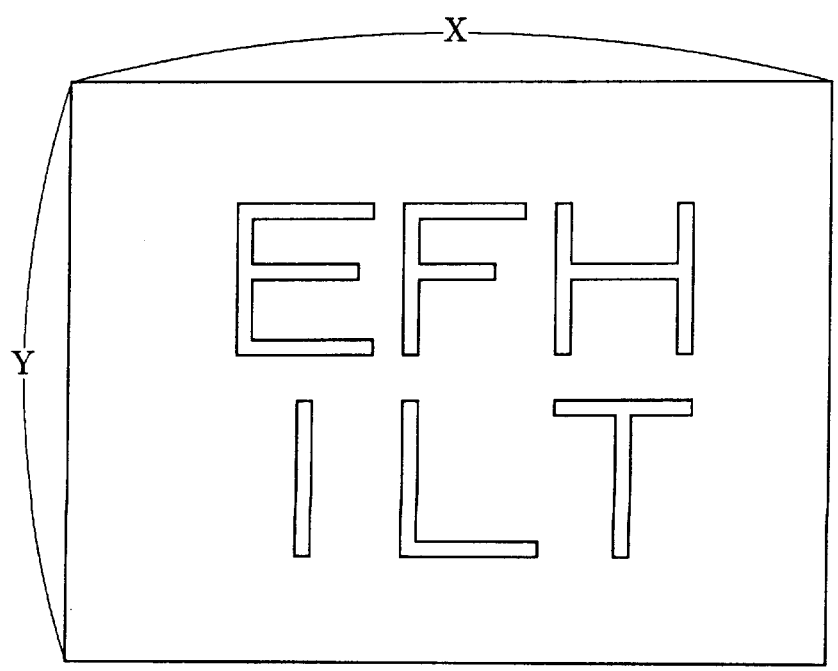
FIG. 5 is a view showing one example of a bit map data in FIG. 3.
Figure 6:
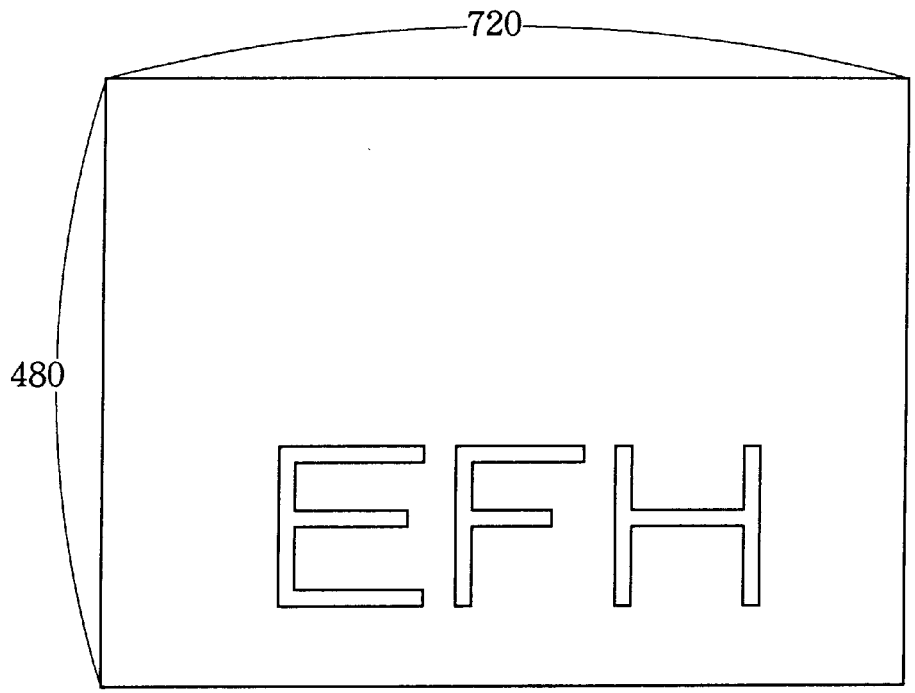
FIG. 6 is a view showing one example of a sub-picture which is output from the bit map buffer in FIG. 3.

FIG. 5 shows one example of one unit portion of bit map data which is stored in the bit map buffer 108, and FIG. 6 shows one example of the sub-picture which will be output. As shown in FIG. 5, the size of one unit portion of the bit map data which is stored in the bit map buffer 108 is an arbitrary size comprising X pixels in the horizontal direction and Y pixels in the vertical direction (this will be described as (X, Y)) while the size of the sub-picture which will be output is allowed to agree with the image size of the main image. In an example shown in FIG. 6, (720, 480) is set.

Figure 7:
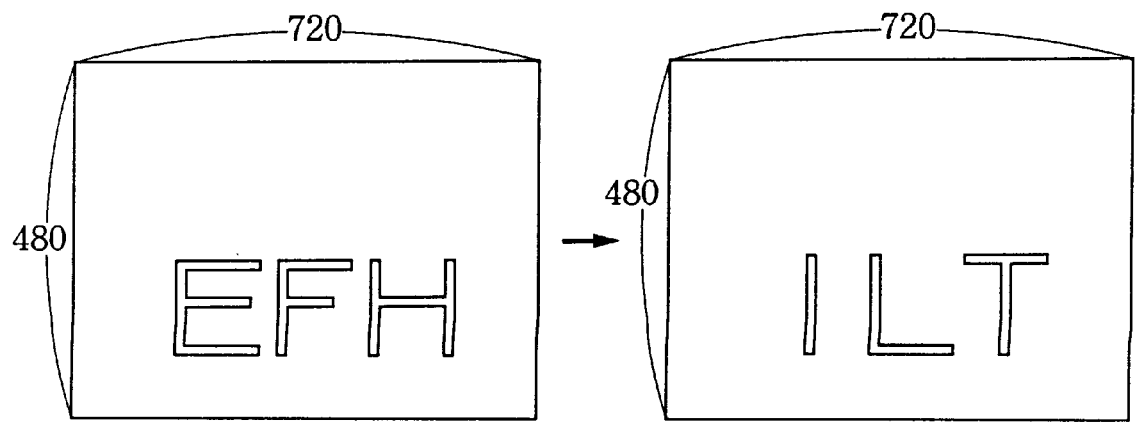
FIG. 7 is a view showing one example of a renewal method of sub-pictures.
Figure 8:
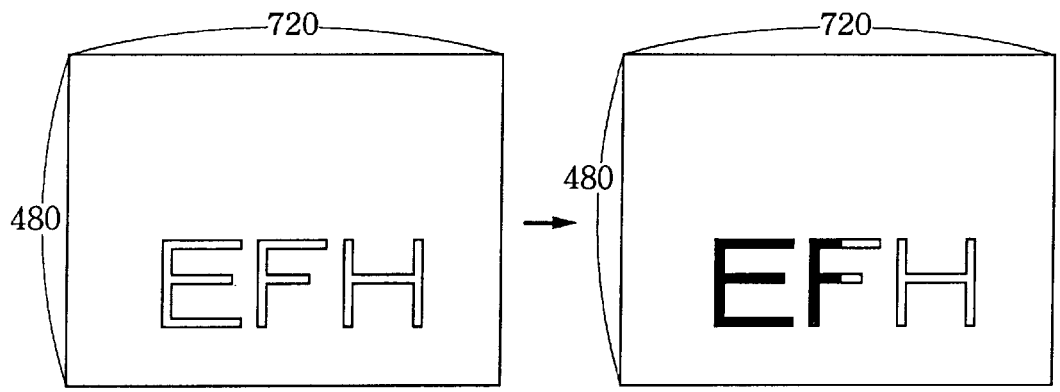
FIG. 8 is a view showing another example of a renewal method of sub-pictures.
Figure 9:
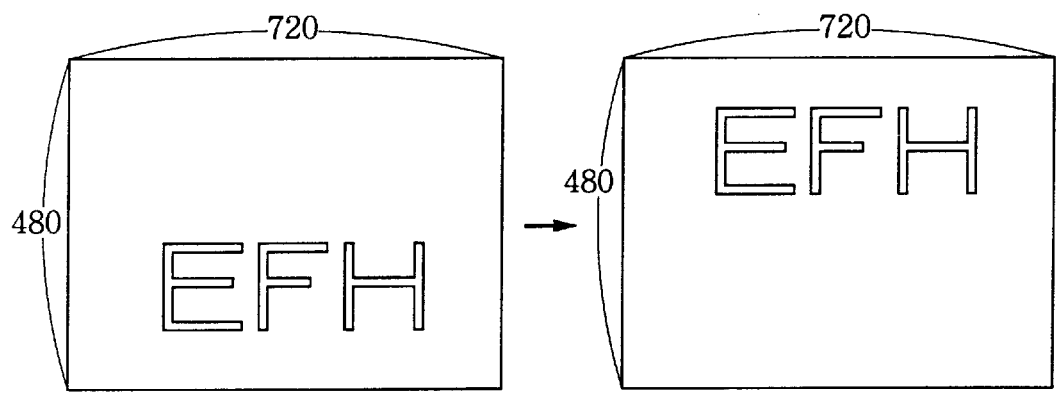
FIG. 9 is a view showing further another example of a renewal method of sub-pictures.

In the renewal method of the sub-picture, there are provided the following three cases; first is a case in which the on and off of the display, and the bit map itself which forms a basis is renewed as shown in FIG. 7, the second is a case in which part of color information is changed without changing the bit map which forms a basis as shown in FIG. 8, and third is a case in which only the display position is changed without changing the color information of the bit map which forms a basis as shown in FIG. 9. The sub-picture which is prepared in this manner is output to the monitor 117 after being overlapped with the main image at the image superposition part 115 shown in FIG. 3.

Figure 10:
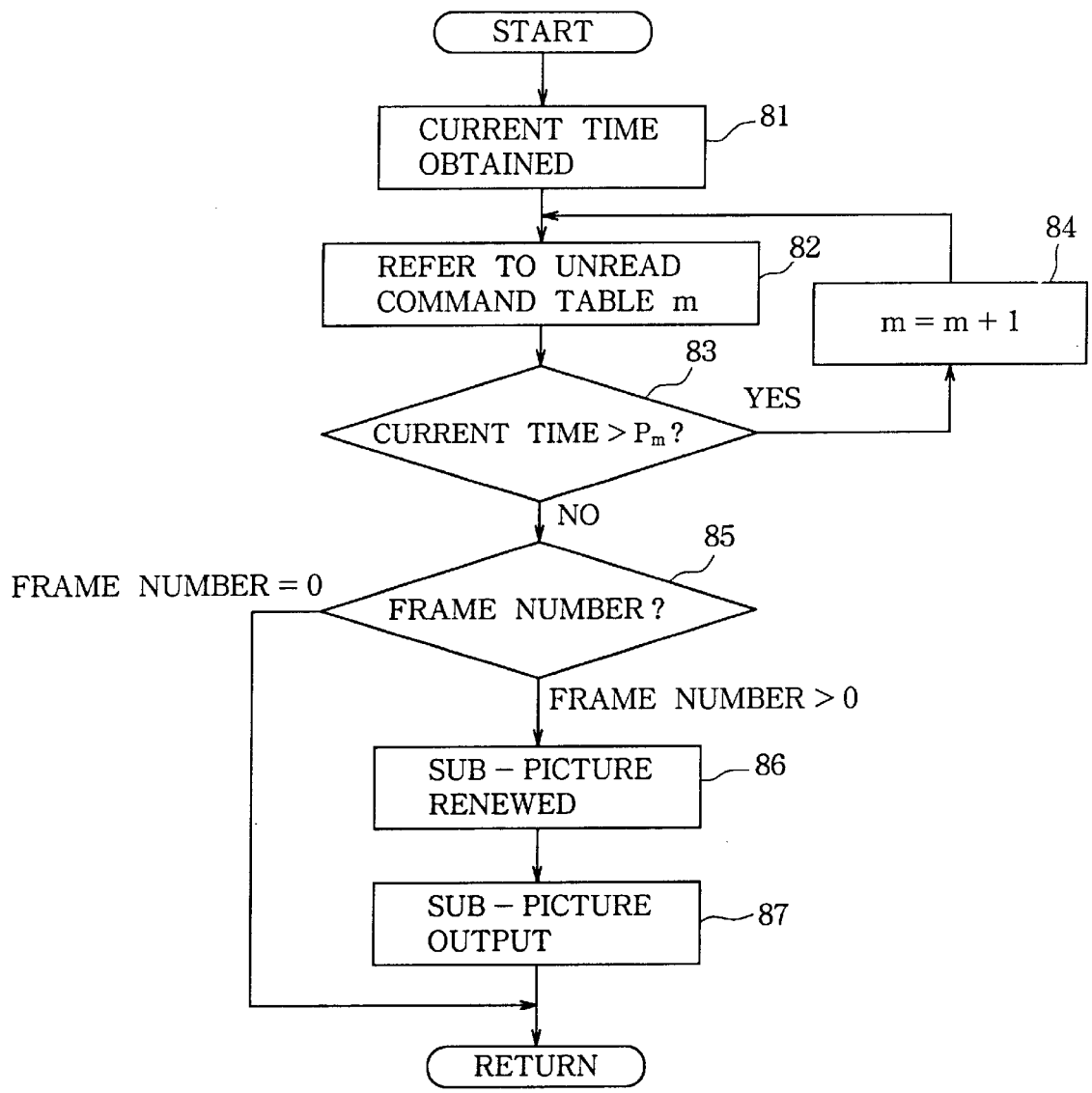
FIG. 10 is a flowchart for explaining an operation of a synchronization control in FIG. 3.

Next, a first example concerning the auxiliary image and the sound synchronous control in operation of the image and sound reproducing device of the present embodiment will be explained. FIG. 10 shows a flowchart of one example of the synchronous control of the device according to the present invention. When the auxiliary image output part 112 of FIG. 3 is called from the overall control part 103, the current time is obtained from the reference clock generating part 111 in the beginning (step 81). The reference clock generating part 111 obtains the accumulation data amount of the PCM data which is output after the start of the reproduction from the sound output part 110 when the reference time requested.

For example, in the case where the format of the PCM data is a stereo signal, the sampling rate is set to 44.1 [kHz], and the bit precision per one sample is set to 16 [bit], the reproduction time after the start of reproduction which is calculated from the accumulation data amount is determined in the following equation 1.

$$\{\text{reproduction time [s]}\} = \{\text{accumulation data amount [Bytes]}\} / \{44.1 \times 1000 \times (16/8) \times 2\} \quad (1)$$

Furthermore, when the output time of the PCM data immediately after the start of reproduction which time is originally regulated in the encoded data is α[s], the reference time is determined from the following equation 2.

$$\{\text{reference time [s]}\} = \alpha + \{\text{reproduction time}\} \quad (2)$$

Subsequently, the unread command table entry m is referred to and the output time of the sub-picture will be obtained (step 82). If the current time is smaller than the output time $P_m$ (namely, the current time does not attain the output time $P_m$), the frame number of the sub-picture which is processed at this time (the number of pictures in the MPEG method) is obtained to check whether or not the obtained frame number is 0 or not (step 85). When the frame number is 0, no particular processing is carried out and the processing is brought back to the overall control part 103.

On the other hand, when the current time is larger than the output time Pm(namely, the current time passes the output time $P_m$), the value of m is incremented by 1 (step 83), the next entry is referred to (step 82), and further, the current time is compared with the output time $P_m$ of the sub-picture. Since the value of m is incremented by 1 immediately before it, the current time is smaller than the output time $P_m$ of the sub-picture to check whether or not the number of pictures which is processed at the previous output time $P_m$, or the frame number is 0 (step 85). When there are one or more frames, the sub-picture is output after the sub-picture is subsequently renewed (step 86) followed by outputting the sub-picture (step 87).

Figure 11:
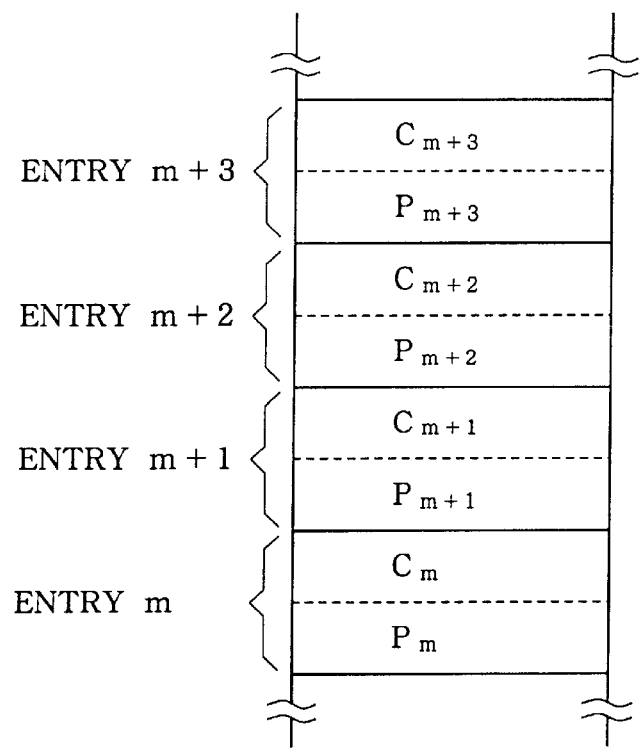
FIG. 11 is a view showing a concrete example of a command table.
Figure 12:
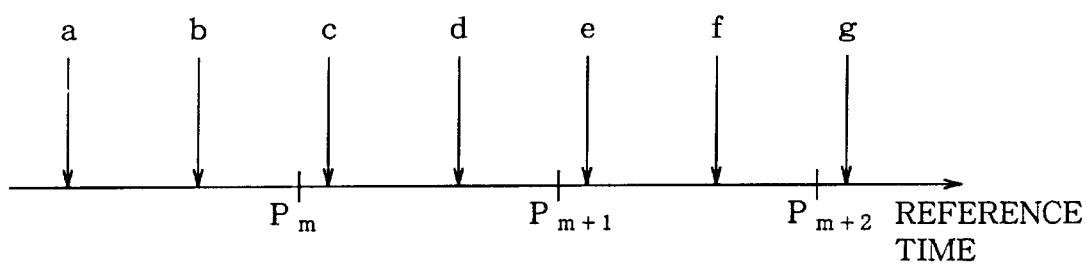
FIG. 12 is a view showing one example of a time relation between the current time obtained from the reference clock generating part in FIG. 3 and an output time of the sub-picture stored in the command table.

Next, the aforementioned processing will be concretely explained together with FIG. 11 and FIG. 12. FIG. 11 shows one concrete example of the command table 113. Furthermore, FIG. 12 shows a time relation between the current time obtained from the reference clock generating part 111 and the output time of the sub-picture which is stored in the command table 113 when the control is moved to the auxiliary image output part 112.

In the beginning, when the current time is point "a" of FIG. 12, the output time $P_m$ of the sub-picture from the unprocessed entry m is read. However, a relation of a<$P_m$ is set (in other words, the current time "a" does not reach the output time $P_m$), the control is brought back to the overall control part 103 without carrying out any particular processing via steps 83 and 85 of FIG. 10. In a similar manner, since the current time is set in advance even at point "b" of FIG. 12, no particular processing is carried out to bring the control back to the overall control part 103.

Next, when the current time is set to point c of FIG. 12, the relation of c>$P_m$ is set. Consequently, after the process proceeds from step 83 to step 84 and the value of m is incremented by 1, the entry m+1 of the unread command table is referred at step 82. Then, since it is judged that the current time "c" is smaller than the output time $P_{m+1}$ at step 83, it is judged at the subsequent step 85 whether or not the frame number is 0 at step 85.

Figure 13:
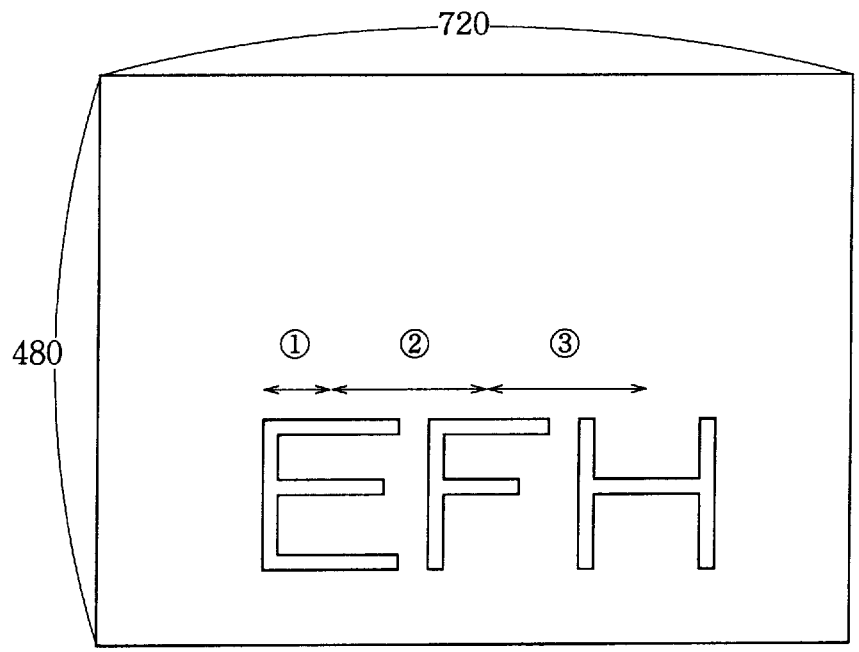
FIG. 13 is a view showing one example of a renewed sub-picture.
Figure 14:
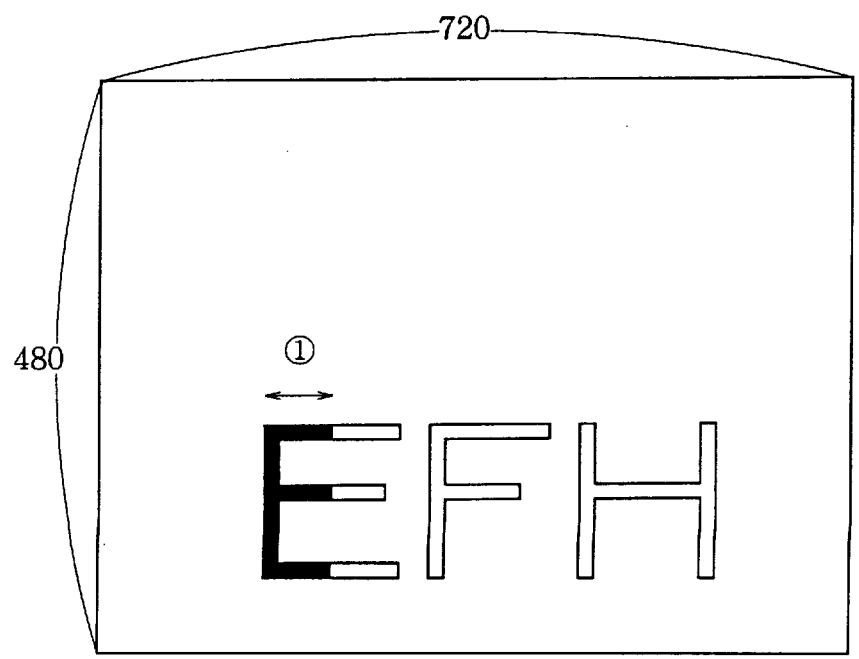
FIG. 14 is a view showing another example of a renewed sub-picture.

At this point, the picture of the output time $P_m$ is present, the sub-picture is renewed in accordance with the display method (command $C_m$) which is stored in the entry m (step 86). When the display method in which, for example, part of the color (①in FIG. 13) using the bit map which is the same as the sub-picture at the previous time is changed and the display position is the same as the previous time is recorded in the command $C_m$, the image output part 112 of FIG. 3 renews the sub-picture as shown in FIG. 14 (step 86), outputs the sub-picture to the image superposition part 115 (step 87), and brings the control back to the overall control part 103. The image superposition part 115 overlaps the sub-picture with the main image data and outputs the sub-picture to the monitor 117.

Figure 15:
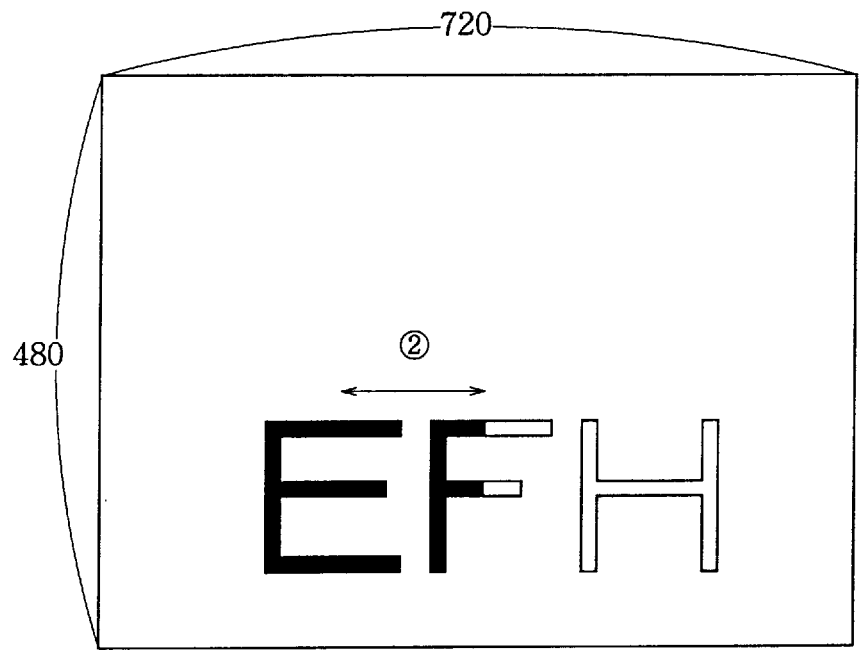
FIG. 15 is a view showing another example of a renewed sub-picture.

In a similar manner, the sub-picture is renewed in accordance with the display method (command $C_{m+1}$) which is stored in entry m+1 when the current time is set to point "e" of FIG. 12 and in accordance with the display method (command $C_{m+2}$) which is stored in the entry m+2 when the current time is set to point "g" of FIG. 12. When the display method in which, for example, part of color (② of FIG. 13) using the bit map which is the same as the sub-picture (FIG. 14) at the previous time is changed and the display position is the same as the previous time is recorded in the command $C_{m+1}$, the sub-picture is renewed as shown in FIG. 15.

Figure 16:
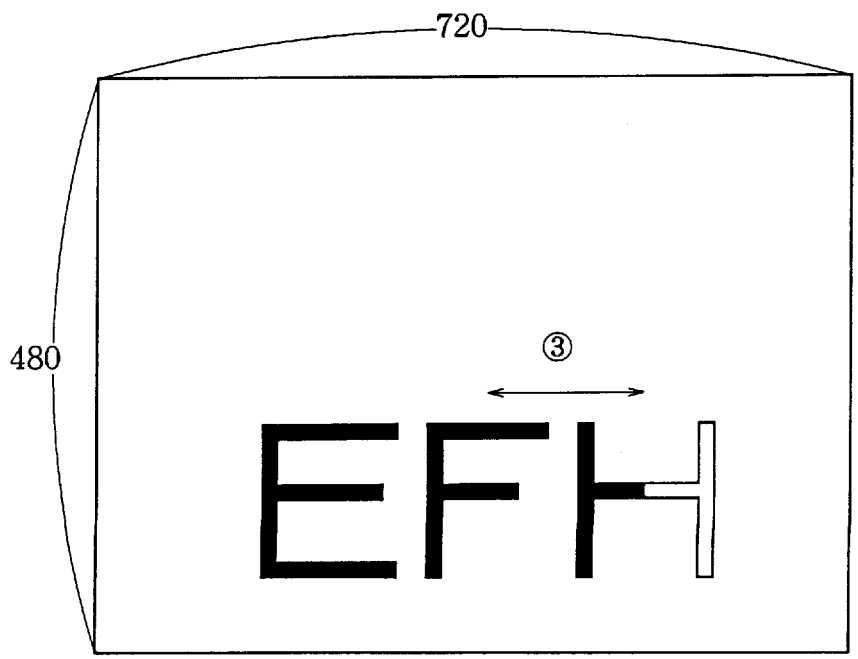
FIG. 16 is a view showing further another example of a renewed sub-picture.

Furthermore, when the display method in which, for example, part of color (③ of FIG. 13) using the bit map which is the same as the sub-picture (FIG. 15) at the previous time is changed and the display position is the same as the previous time is recorded in the command $C_{m+2}$, the sub-picture is renewed as shown in FIG. 16. Then, the aforementioned processing is repeated until the processing of all the encoded data which is recorded in the memory device 101 of FIG. 3 is ended.

Figure 17:
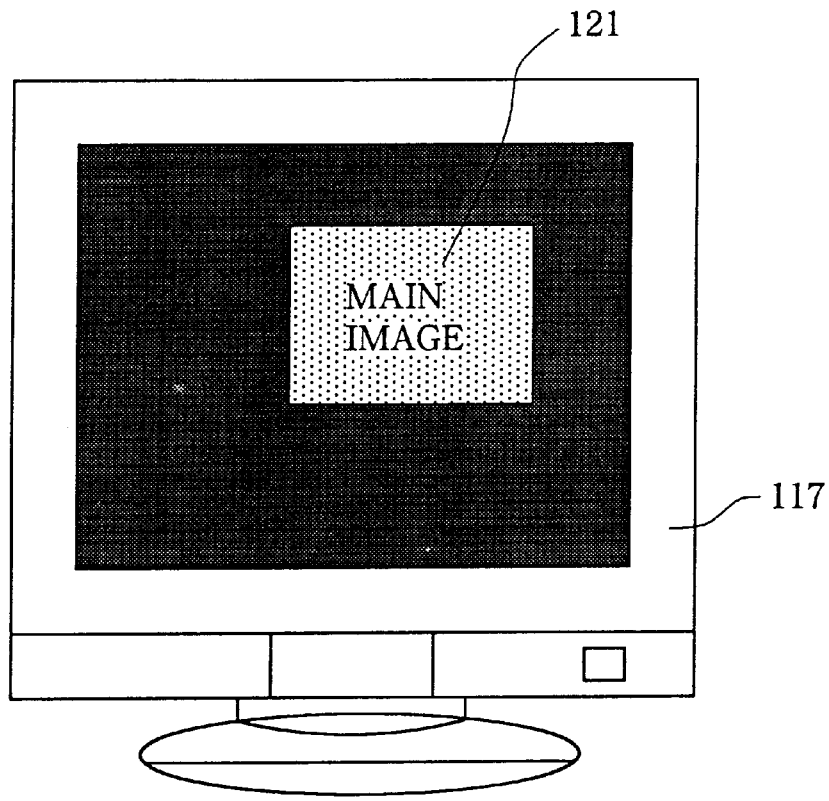
FIG. 17 is a view for explaining one example of an image display.

Here, as one example of the superposition processing in the image superposition part 115, when the main image data is displayed in such a manner that the main image data is overlapped with part of the window frame 121 of the monitor 117 as shown in FIG. 17, the area other than the character data of the sub-picture is set in an overlaid transparent color and a processing for plastering the bit map data of the renewed sub-picture in the window frame 121 which is the same as the main image.

Figure 1:
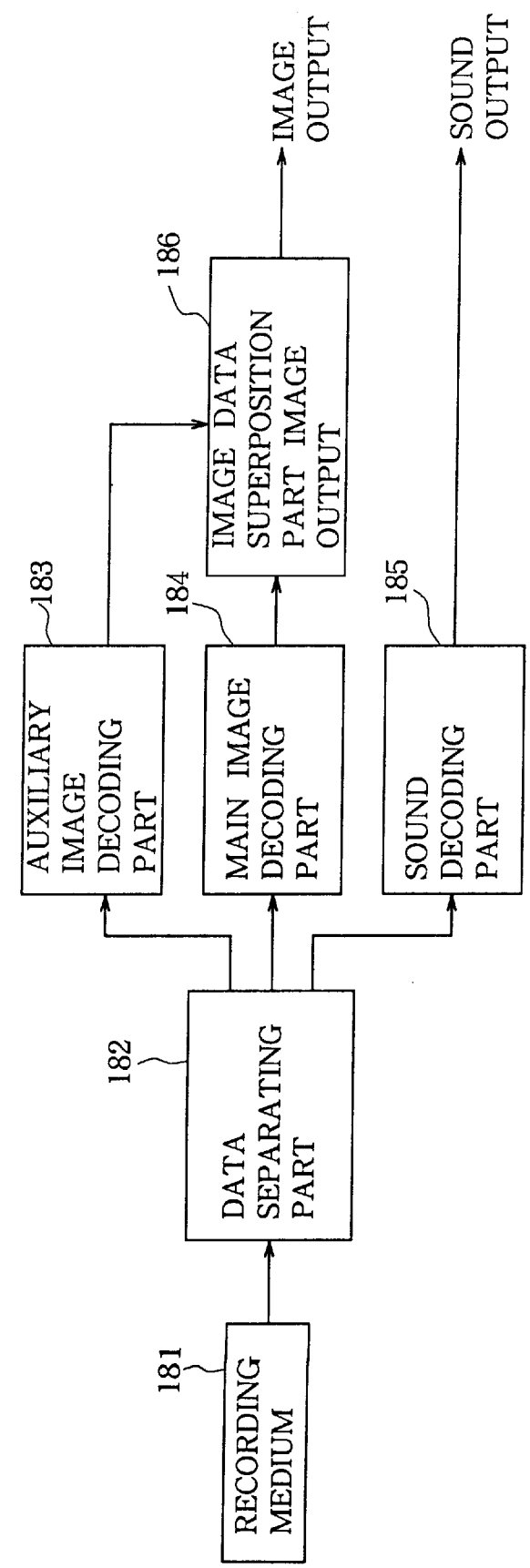
FIG. 1 is a block diagram showing a conventional image and sound reproducing device.
Figure 2:
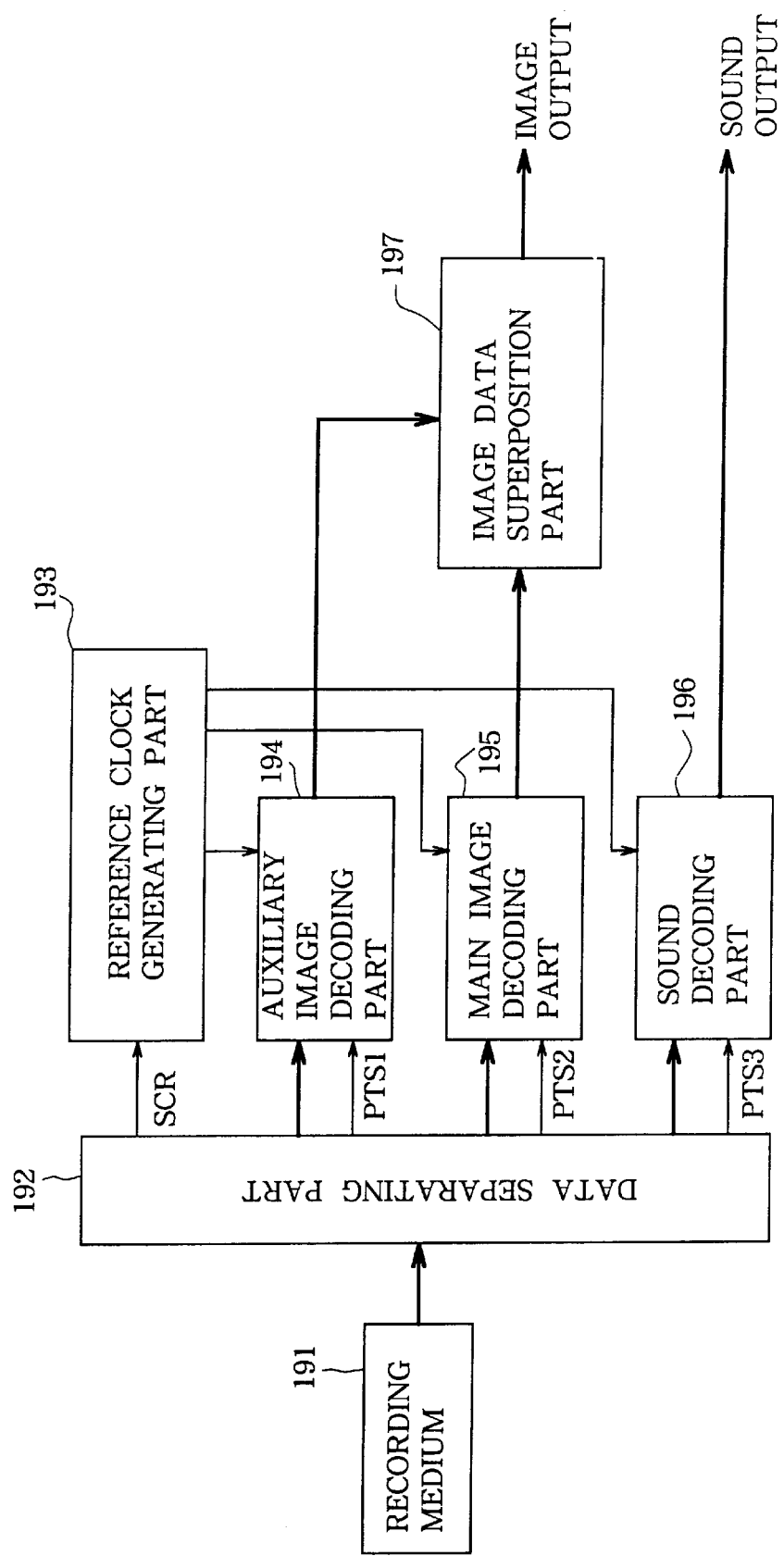
FIG. 2 is a block diagram showing another conventional image and sound reproducing device.
Figure 18:
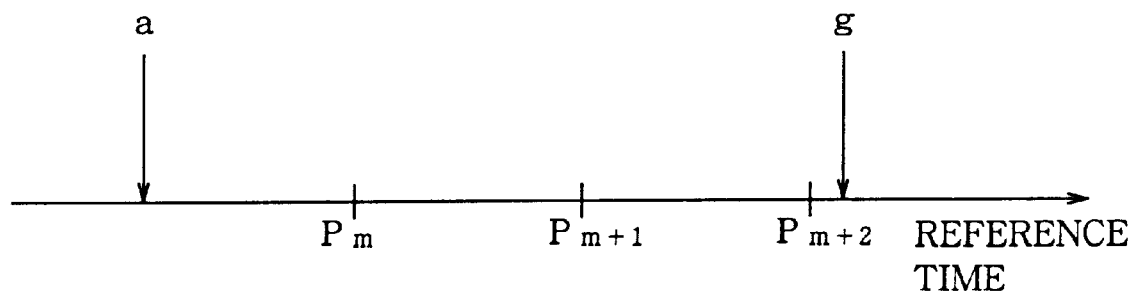
FIG. 18 is a view showing another example of a time relation between the current time obtained from the reference clock generating part in FIG. 3 and an output time of the sub-picture stored in the command table.

Next, a second example concerning the auxiliary image and sound synchronous control in operation of the image and sound reproducing device according to the present embodiment will be explained. FIG. 18 shows a time relation a time relation between the current time obtained from the reference clock generating part 111 in FIG. 1 and an output time of the sub-picture stored in the command table 113 when the control is transferred to the auxiliary image output part 112.

The processing capability of the reproducing device is lowered, and the overall control part 103 cannot sufficiently call the auxiliary image output part 112, and a plurality of unprocessed pictures are detained as shown by point g of FIG. 18 (namely a delay state is generated), the sub-picture is renewed and processed in accordance with the display method (command $C_m$) which is stored in the entry m in the beginning.

When the display method in which, for example, part of color (① of FIG. 13) using the bit map which is the same as the sub-picture (FIG. 13) at the previous time is changed and the display position is the same as the previous time is recorded in the command $C_m$, the sub-picture is renewed as shown in FIG. 14. Subsequently, the sub-picture is processed and renewed in accordance with the display method (command. $C_{m+1}$)which is stored in entry m+1. When the display method in which, for example, part of color (② of FIG. 13) using the bit map which is the same as the sub-picture (FIG. 14) at the previous time is changed and the display position is the same as the previous time is recorded in the command $C_{m+1}$, the sub-picture is renewed as shown in FIG. 15.

Subsequently, when the display method (command $C_{m+2}$) in which, for example, part of color (③ of FIG. 13) using the bit map which is the same as the sub-picture (FIG. 15) at the previous time is changed and the display position is the same as the previous time is recorded in the command $C_{m+1}$, the sub-picture is renewed as shown in FIG. 16.

Figure 19:
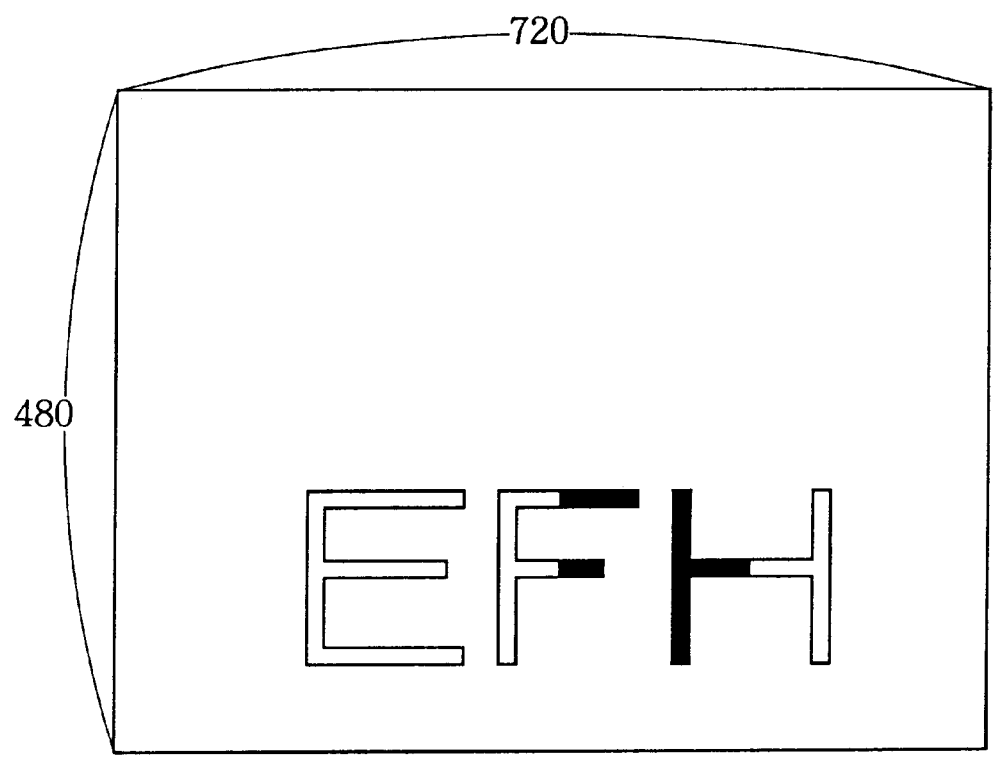
FIG. 19 is a view showing one example of a sub-picture which is renewed in the case of FIG. 18.

Then, the output of the sub-picture which is prepared in accordance with the command $C_m$ and the command $C_{m+1}$ is omitted (namely, the processing for thinning out picture pieces is carried out), and only the sub-picture which is prepared in the command $C_{m+2}$ is output to the image superposition part 115 to bring the control back to the overall control part 103. When the preparation of the sub-picture in the command $C_m$ and the command $C_{+1}$ itself is omitted, the color of parts ① and ② is not changed so that the displayed sub-picture is shown as a defect display in FIG. 19 and only the output processing is omitted.

What is claimed is:

1. An image and sound reproducing device for decoding and reproducing multiplexed data in which main image data, sound data and auxiliary image data which is digitally compressed and encoded is multiplexed, the device comprising:

a data separating part for separating and processing main image data, auxiliary image data and sound data from multiplexed data;

a sound decoding part for decoding and processing said sound data which is separated by the data separating part;

a main image decoding part for decoding and processing main image data which is separated by the data separating part;

an auxiliary image decoding part for decoding and processing auxiliary image data which is separated by the data separating part;

a reference clock generating part for calculating progress time after the start of a reproduction from the accumulation of a sound data amount which is output after decoding by the sound decoding part and the attribute information which is analyzed by the sound decoding part and generating a reference clock on the basis of the progress time:

an auxiliary image output means for controlling an output of the auxiliary image data which is decoded with the auxiliary decoding part on the basis of the reference clock; and an image superposition means for superposition the auxiliary image data which is output from the auxiliary image output means with the main image data which is decoded with the main image decoding part.

2. The image and sound reproducing device according to claim 1, wherein said auxiliary image data is digitally compressed and encoded superimposed characters or words for karaoke.

3. The image and sound reproducing device according to claim 1, wherein said auxiliary image output means comprises:

a buffer for storing one unit portion of auxiliary image data which is decoded in said auxiliary image decoding part;

a command table for fetching from said data separating part and said auxiliary image decoding part and storing a header information of a display time and a display method of the auxiliary image which is added to said multiplexed data as a set of entry; and an image output part for outputting auxiliary image data which is stored in said buffer in synchronization with said reference clock and in the display time and the display method which is stored in said command table.

4. The image and sound reproducing device according to claim 3, wherein said auxiliary image output means compares the current time obtained on the basis of said reference clock with a display time obtained by referring to the command table so that the display time and the display method of the next auxiliary image data of said command table is referred to only when said current time reaches said display time and said command table is output from said buffer by renewing the auxiliary image data in accordance with the display method when said command table is referred to at a previous time.

5. The image and sound reproducing device according to claim 1, wherein an image output part of said auxiliary image output means synchronically corrects auxiliary image data by thinning out the superposition processing of the auxiliary image data when the decoding process of the auxiliary image data and the superposition processing to the main image can not be operated in real time.

6. The image and sound reproducing device according to claim 3, wherein the image output part of said auxiliary image output means refers to the display time and the display method of the next auxiliary image data of the current time in said command table when the current time obtained on the basis of said reference clock with the display time obtained by referring to said command table, and when said current time passes a plurality of unread display time in said command table, and at the same time, the image output means refers to a plurality of unread display method corresponding to the plurality of unread display times to subsequently renew and process the auxiliary image data from said buffer, and at the same time, thins out and outputs only the auxiliary image data which is renewed and processed by referring to unread display method corresponding to the last display time out of the plurality of said unread display times.

* * * * *